July 13, 1926. Re. 16,383
C. McL. MOSS ET AL
SELECTIVE TRANSFER SWITCH
Original Filed June 3, 1921
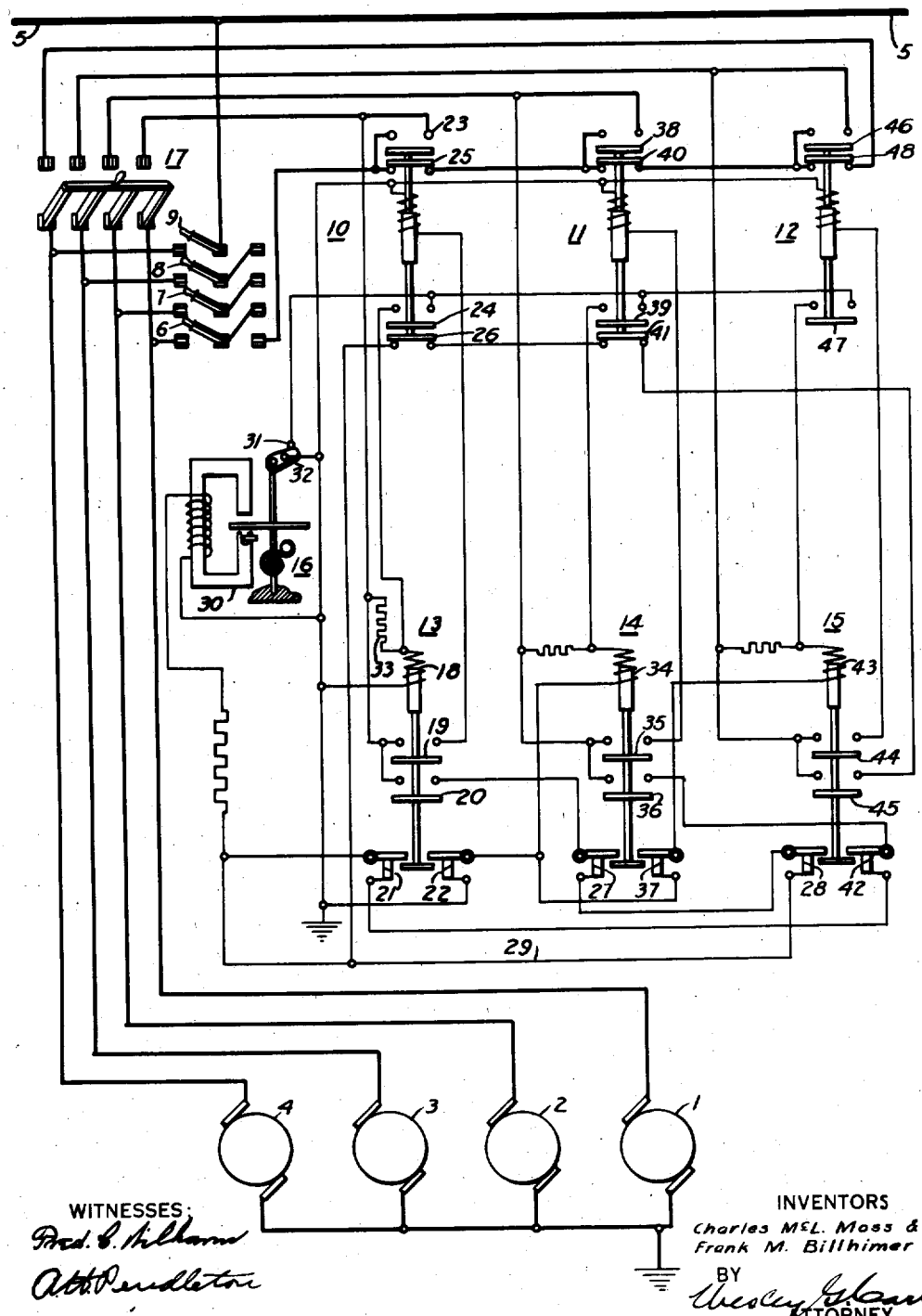
WITNESSES:
Fred. E. Williams
Abb. Pendleton
INVENTORS
Charles McL. Moss &
Frank M. Billhimer
BY
Wesley G. Carr
ATTORNEY Reissued July 13, 1926. Re. 16,383

UNITED STATES PATENT OFFICE.

CHARLES McL. MOSS, OF PITTSBURGH, AND FRANK M. BILLHIMER, OF WILKINSBURG, PENNSYLVANIA, ASSIGNORS TO WESTINGHOUSE ELECTRIC AND MANUFACTURING COMPANY, A CORPORATION OF PENNSYLVANIA.

SELECTIVE TRANSFER SWITCH.

Original No. 1,528,071, dated March 3, 1925, Serial No. 474,790, filed June 3, 1921. Application for reissue filed June 1, 1925. Serial No. 33,871.

Our invention relates to selective transfer systems and particularly to such systems as are automatic in their operation.

One object of our invention is to provide a transfer system for a plurality of sources of energy that shall maintain an electric circuit energized continuously.

Another object of our invention is to provide a system of the above-indicated character embodying means whereby one of the sources of energy may be connected to the circuit in a predetermined sequence of selection depending upon the condition of the sources preceding in the predetermined sequence.

Another object of our invention is to provide a system of the above-indicated character that shall be simple and inexpensive in construction and reliable in its operation.

In operating railway signals and semaphores, it is essential that the control bus from which the operating energy is derived shall always be energized. To obtain the continuous energization of such a bus, it is necessary to provide more than one source of electrical energy in order that the control bus may be transferred from one source of energy, when that source becomes faulty, to another source of energy that is normal.

It is also desirable that the various sources of energy be connected to the bus in a predetermined sequence. Thus, if the first of a plurality of sources becomes faulty and inoperative, the connections should be automatically transferred to connect the bus to the second source.

Similarly, if the second source should become faulty while the first source remains faulty, the bus circuit should be transferred to a third source of energy. If, after the third source has been supplying energy to the bus, either the first or the second source should become normal, it is desirable that the control bus be transferred from the third source to either the first or the second source that has meanwhile become normal.

In practicing our invention, we employ a plurality of sources of electromotive force illustrated herein as four sources. To control the connection of these sources of electromotive force to a control bus, we provide three circuit interrupters and three relays for severally controlling the interrupters. The relay associated with the first source is connected directly thereacross, and, when energized, is adapted to effect the closing of the first interrupter to connect the first source of energy to the bus.

The energizing circuit of the second relay, that controls the actuation of the corresponding interrupter to connect the second source of electromotive force to the bus circuit, is completed through a plurality of contact members controlled by the relay associated with, and controlled by, the first source. These contacts are open while the relay associated with the first source is energized, and are closed when that relay is deenergized. Thus, the second relay cannot be energized while the first relay is energized and is in an operative position, but may become energized upon the deenergization of the relay associated with the first source.

Similarly, the energized circuit of the relay associated with the third source is completed through two sets of contact members severally controlled by the relays associated with the first two sources of energy. When either relay is operating, the third relay cannot be energized, but when both the first and the second relays are deenergized, the third may be energized if the third source of electromotive force is normal.

If the first three sources of electromotive force are inoperative, none of the relays become energized to connect any one of those sources of the control circuit. The corresponding interrupters of the three sources are therefore opened. Under such conditions, the fourth source of energy is adapted to be connected to the control circuit, through three sets of contact members that are severally controlled by the circuit interrupters.

The single figure of the accompanying drawing is a diagrammatic view of an electrical system embodying our invention.

Referring to the diagram, in which all of the operating devices are shown in their deenergized position, a plurality of sources of electromotive force 1, 2, 3 and 4, respectively, are employed to supply energy to a control circuit 5 in a predetermined sequence of selection. The selective connection of the sources of electromotive force may be effected manually by means of four single-pole, double-throw switches 6, 7, 8 and 9 or may be controlled automatically by means of a plurality of circuit interrupters 10, 11 and 12. The actuation of the interrupters 10, 11 and 12 to connect the corresponding sources of energy to the control circuit 5 is controlled by a plurality of relays 13, 14 and 15, respectively, that are adapted to be connected across the corresponding sources of energy under predetermined conditions.

In order that rugged relays and interrupters may be employed for effective service, a sensitive voltage relay 16 is employed to control the relays 13, 14 and 15 in accordance with the condition of the corresponding sources of energy and to obviate the necessity of different settings for the various relays. That is, the relays 13, 14 and 15 are permitted to operate at a definite voltage, whereas the voltage relay 16 serves to control those relays in accordance with the conditions of the various sources of energy.

When it is desired to operate the system manually, a four-pole, single-throw switch 17 is employed to disconnect the automatic relays and interrupters from the several sources of energy and the switches 6, 7, 8 and 9 are closed on the left side depending upon which source of energy is to be connected to the control circuit 5.

When the first circuit is to be connected to the bus circuit 5, only the switch 6 is closed in its left-hand position and the other switches 7, 8 and 9 are closed in their right-hand positions. If the first source should become faulty, switch 7 would thereupon be closed in its left-hand position and switches 8 and 9 would be left in their previous positions. Similarly, switches 8 and 9 would be closed in their left-hand positions when the connection of either of the other sources 3 or 4 to the control circuit 5 should be desired.

When it is desired to operate the system automatically, the switch 17 is closed and the single-pole switches 6, 7, 8 and 9 are closed in their right-hand positions. Assuming that all the sources 1, 2, 3 and 4 are normal, the operating coil 18 of the relay 13 becomes energized and that relay closes two switches 19 and 20 and opens two sets of contact members 21 and 22, respectively.

The switch 19, when closed, completes a circuit from the source 1 through the operating coil of the interrupter 10, which is thereupon actuated to close switches 23 and 24 and to open switches 25 and 26. The switch 23, when closed, completes a circuit from the source 1 of energy through the single-pole, double-throw switches 6, 7, 8 and 9 to the control circuit 5, since the latter switches will all be closed in their right-hand positions.

The switch 20, when closed, completes a circuit from the source 1 through a set of contact members 27 controlled by the relay 14 and a set of contact members 28 controlled by the relay 15 through a relay bus conductor 29 and the operating coil 30 of the voltage relay 16. The relay 16, upon becoming energized, effects the disengagement of its contact members 31 and 32.

When a fault occurs on the source 1 that renders that course inoperative for supplying energy to the control circuit 5, the voltage relay 16 becomes sufficiently deenergized to permit the reengagement of its contact members 31 and 32, whereupon the winding 18 is short-circuited through the switch 24 of the interrupter 10 and is rendered ineffective for maintaining the relay 13 in its energized position. The resistor 33 is provided to prevent a short-circuit on the source 1.

Upon the deenergization of the operating coil 18 of the relay 13 and the consequent opening of the switches 19 and 20 and the reengagement of the contact members 21 and 22, the voltage relay 16 is disconnected from the source 1 and a circuit is completed by the contact members 22 for energizing the operating coil 34 of the relay 14. The relay 14, when actuated, closes its two switches 35 and 36 and opens two sets of contact members 27 and 37, respectively.

The switch 35, when closed, energizes the operating coil of the interrupter 11 whereupon the same is actuated to close two switches 38 and 39 and to open two switches 40 and 41, respectively. The switch 38, when closed, connects the source 2 to the control circuit 5 through the switch 25, of the interrupter 10, which closed upon the deenergization of the holding coil of the interrupter 10.

The switch 36, when closed, completes a circuit from the source 2 of energy through a set of contact members 42 of the relay 15 and the contact members 21 of the relay 13, the relay bus conductor 29 and the operating coil 30 of the voltage relay 16 to ground, thereupon energizing the relay 16 in accordance with the potential of the source 2.

It may be assumed that the source 1 remains inoperative and that the source 2 now also becomes inoperative, or, for instance, by reason of low voltage. The relay 16 effects the reengagement of its contact members 31 and 32, whereupon the winding 34 of the relay 14 is short-circuited by the contact members 31 and 32 through the switch 39 of the interrupter 11 and the engaged contact members 22 of the relay 13. The relay 14 is immediately actuated to its deenergized position and the interrupter 11 is also actuated to its deenergized, or open position.

If the sources 1 and 2 remain inoperative, the operating coil 43 of the relay 15 becomes energized by reason of its being connected between the source 3 and ground through the contact members 22 and 37 of the relays 13 and 14, respectively. The relay 15 is operated to close its switches 44 and 45 and to open its contact members 28 and 42.

The closing of the switch 44 effects the actuation of the interrupter 12 whereupon its switches 46 and 47 are closed and the switch 48 is opened. The switch 46 connects the source 3 of the control circuit 5 through the switches 40 and 25 of the interrupters 11 and 10, respectively.

If the source 3 should become inoperative while sources 1 and 2 are inoperative, the relay 15 would be deenergized and the interrupter 12 opened, as explained above for the operation of the relays 13 and 14. The opening of the interrupter 12 would close the switch 48 whereupon the source 4 of energy would be connected to the control circuit 5 through the switches 48, 40 and 25 in series.

Upon the return to normal of any one of the first three sources of energy, the corresponding relay 13, 14 or 15 would be immediately energized to close the corresponding interrupter to reconnect the normal source to the control circuit 5. The operation of the relay 13 will effect the opening of switches 21 and 22 to preclude the energization of the relays 14 and 15 so long as such switches remained open. Similarly, the operation of the relay 14 would preclude the energization of the relay 15 by reason of the opening of switch 37.

It will thus be observed that the connection of any one of the sources of energy to the control circuit 5 is so selectively effected, in a predetermined sequence, that the first normal source in the predetermined sequence will be connected to the control circuit, irrespective of the condition of the other sources of energy.

Our invention is not limited to the specific arrangement of the apparatus employed nor to the specific types of apparatus illustrated, since various modifications may be made in the arrangement thereof within the spirit and scope of the invention, as set forth in the appended claims.

We claim as our invention:

1. The combination with an electrical circuit and three or more sources of energy for energizing the circuit, of selective means for connecting the sources of energy to the circuit in a predetermined sequence in response to predetermined conditions, for precluding energization of the circuit by more than one of the sources simultaneously, and for automatically reconnecting a source of energy previously disconnected in said sequence to the circuit in response to predetermined conditions.

2. The combination with an electrical circuit and N sources of energy for energizing the circuit, of means for connecting a predetermined source to the circuit and then connecting the other sources to the circuit in a predetermined sequence only when the preceding sources in the sequence become inoperative, for precluding energization of the circuit by more than one of the sources simultaneously, and for automatically disconnecting the last source connected in said sequence and connecting an earlier source in the sequence to the circuit in response to predetermined conditions.

3. The combination with an electrical circuit and N sources of energy for energizing the circuit, of means for connecting one of the sources to the circuit only when the preceding sources, in a predetermined sequence, are faulty, maintaining that connection until a preceding source in the predetermined sequence is cleared of the fault and then connecting said preceding source to the circuit, thereby also simultaneously disconnecting the former source.

4. The combination with an electrical circuit and N sources of energy for energizing the circuit, of means for connecting one of the sources to the circuit, in accordance with a predetermined sequence of selection, when the previous sources in the sequence become inoperative, for precluding energization of the circuit by more than one of the sources simultaneously, and for automatically disconnecting the last source connected in said sequence and connecting an earlier source in the sequence to the circuit in response to predetermined conditions.

5. The combination with an electrical circuit and N sources of energy for energizing the circuit, of N—1 relays for controlling the selective connection of one of the sources to the circuit when the previous sources, in a predetermined sequence, are inoperative, and means whereby each relay, when effective, renders the other relays in subsequent sequence thereto ineffective.

6. The combination with an electrical circuit and N sources of energy for energizing the circuit, of means for automatically connecting the circuit to the first one of the several sources that is normal, in a predetermined sequence of selection, and for precluding the connection of the circuit to any source subsequent in the sequence while said normal source is normal.

7. The combination with an electrical circuit and N sources of energy for energizing the circuit, of means for automatically connecting the circuit to one of the several sources, in a predetermined sequence of selection, when the preceding sources are inoperative, and for automatically and selectively disconnecting the circuit from said source to connect the same to a preceding source, in the predetermined sequence, that has meanwhile been rendered operative.

8. The combination with an electrical circuit and N sources of energy for energizing the circuit, of a plurality of relays severally associated with each source of energy and adapted to be actuated in accordance with the condition thereof, means controlled by the relays for connecting each source to the circuit, and means controlled by the relays of one source for effecting the actuation of the corresponding connecting means and for rendering predetermined relays associated with the other sources ineffective.

9. The combination with an electrical circuit and a plurality of sources of energy for energizing the circuit, of a relay for each source of energy, connecting means for each source and the circuit controlled by the corresponding relay, and means controlled by each relay for rendering other relays ineffective under predetermined conditions.

10. The combination with an electrical circuit and a plurality of sources of energy for energizing the circuit, and adapted to be connected thereto in a predetermined sequence, of a relay for each source reponsive to the condition thereof for effecting the connection of the source to the circuit only when the preceding sources in the predetermined sequence are inoperative, and means whereby the connection of only one source of energy to the circuit is permitted.

11. In combination, a source of current, a second source of current, a third source of current, a distribution system, switching means arranged to connect said sources to said system, and means operative in response to the voltage of said sources to effect the operation of said switching means to establish the connection of said first mentioned source to said distribution system whenever said first source is energized, the connection of said second source to said distribution system whenever said first source is not energized and said second source is energized, and the connection of said third source to said distribution system whenever said third source is energized and the other two sources are not energized.

12. In combination, a source of current, a second source of current, a third source of current, a distribution system, switching means arranged to connect said sources to said system, and means operative in response to the voltages of said sources to effect the operation of said switching means to establish the connection of said first mentioned source to said distribution system, and the disconnection of the other sources from said distribution system whenever said first source is energized, the connection of said second source to said distribution system and disconnection of the other sources from said distribution system whenever said second source is energized and said first source is not energized, and the connection of said third source to said distribution system and the disconnection of the other sources from said distribution system whenever said third source is energized and the other sources are not energized.

13. In combination, a source of current, a second source of current, a third source of current, a distribution system, switching means arranged to connect said sources to said system, and means operative in response to the voltages of said sources to effect the operation of said switching means to establish the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, and the connection of said third source to said distribution system when said second source fails, said first source is not energized and said third source is energized.

14. In combination, a source of current, a second source of current, a third source of current, a distribution system, switching means arranged to connect said sources to said system, and means operative in response to the voltage of said sources to effect the operation of said switching means to establish the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, the connection of said third source to said distribution system when said second source fails said first source is not energized and said third source is energized and the disconnection of said third source from said distribution system when either one of said other sources is energized.

15. In combination, a source of current, a second source of current, a third source of current, a distribution system, switching means arranged to connect said sources to said system, and means operative in response to the voltages of said sources to effect the operation of said switching means to establish the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, and the connection of said third source to said distribution system when said first source fails said second source is not energized and said third source is energized.

16. In combination, a source of current, a second source of current, a third source of current, a distribution system, switching means arranged to connect said sources to said system, and means operative in response to the voltages of said sources to effect the operation of said switching means to establish the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, the connection of said third source to said distribution system when said first source fails said second source is not energized and said third source is energized, and the disconnection of said third source from said distribution system when either one of said other sources is energized.

17. In combination, a source of current, a second source of current, a third source of current, a distribution system, switching means arranged to connect said sources to said system and means arranged to effect the operation of said switching means to establish the connection of said first-mentioned source to said distribution system whenever said first source is energized, the connection of said second source to said distribution system whenever said first source is not energized and said second source is energized, and the connection of said third source to said distribution system whenever said third source is energized and the other two sources are not energized, said last mentioned means comprising means responsive to the respective voltages of said sources, and means for automatically controlling the sequence of operation of said switching means.

18. In combination, a source of current, a second source of current, a third source of current, a distribution system, switching means arranged to connect said sources to said system, and means arranged to effect the operation of said switching means to establish the connection of said first mentioned source to said distribution system when said first source is energized, the disconnection of said first source from said distribution system when said source fails, the connection of said second source to said distribution system when said first source is not energized and said second source is energized the disconnection of said second source from said distribution system when said second source fails or said first source is energized, the connection of said third source to said distribution system when said first source fails said second source is not energized and said third source is energized and the disconnection of said third source from said distribution system when either one of said other sources is energized or said third source fails, said last mentioned means comprising means responsive to the voltages of said sources, and means for automatically controlling the sequence of operation of said switching means.

19. An electric system comprising a source of current, a second source of current, a third source of current, a distribution system, switching means arranged to connect each source to said distribution system, and means arranged to effect the connection of said first mentioned source to said distribution system whenever said first mentioned source is energized, the connection of said second source to said distribution system whenever said first source is not energized and said second source is energized and the connection of said third source to said distribution system whenever said third source is energized and the other two sources are not energized, said last mentioned means comprising means responsive to the respective voltages of said sources, and circuit controlling means arranged in cooperative relationship with each of said switching means and arranged to cooperate with said voltage responsive means to control said switching means.

20. An electric system comprising a source of current, a second source of current, a third source of current, a distribution system, switching means arranged to connect each source to said distribution system, means arranged to effect the connection of said first mentioned source to said distribution system when said first source is energized, the disconnection of said first source from said distribution system when said source fails, the connection of said second source to said distribution system when said first source is not energized and said second source is energized, the disconnection of said second source from said distribution system when said second source fails or said first source is energized, the connection of said third source to said distribution system when said first source fails said second source is not energized and said third source is energized, and the disconnection of said third source from said distribution system when either one of said other sources is energized, said last mentioned means comprising means responsive to the respective voltages of said sources, and circuit controlling means arranged in cooperative relationship with each of said switching means and arranged to cooperate with said voltage responsive means to control said switching means.

21. The combination with a plurality of sources of energy to supply energy to a plurality of bus sections, of means for controlling the connection of said sources to the bus sections in a predetermined sequence to permit the respective sources to supply energy to the associated bus sections and means for substituting one of the sources for one of the previously connected sources, upon the occurrence of abnormal conditions in said previously connected source, to permit the substituted source of energy to supply energy to the bus section associated with the faulty source of energy.

In testimony whereof, we have hereunto subscribed our names this 29th day of May, 1925.

CHARLES McL. MOSS.
FRANK M. BILLHIMER.